(12) United States Patent
Lourenco et al.

(10) Patent No.: US 7,854,567 B2
(45) Date of Patent: Dec. 21, 2010

(54) METHOD TO INCREASE STORAGE CAPACITY OF NATURAL GAS STORAGE CAVERNS WITH A REFRIGERATION SYSTEM

(76) Inventors: Jose Lourenco, 16640-111 Avenue, Edmonton, Alberta (CA) T5M 2S5; MacKenzie Millar, 16640-111 Avenue, Edmonton, Alberta (CA) T5M 2S5

(*) Notice: Subject to any disclaimer, the term of this patent is extended or adjusted under 35 U.S.C. 154(b) by 159 days.

(21) Appl. No.: 12/178,556

(22) Filed: Jul. 23, 2008

(65) Prior Publication Data

US 2009/0028644 A1    Jan. 29, 2009

(30) Foreign Application Priority Data

Jul. 23, 2007    (CA)    .................................. 2594529

(51) Int. Cl.
*B65G 5/00*    (2006.01)
(52) U.S. Cl. ......................................... 405/53; 62/53.1
(58) Field of Classification Search ................ 405/52, 405/53, 54, 55, 56; 62/50.2, 50.1, 50.5, 50.7, 62/614, 53.1
See application file for complete search history.

(56) References Cited

U.S. PATENT DOCUMENTS

| | | | | |
|---|---|---|---|---|
| 3,848,427 A * | 11/1974 | Loofbourow | ................. | 405/53 |
| 3,950,958 A * | 4/1976 | Loofbourow | ................. | 405/56 |
| 4,276,749 A * | 7/1981 | Crowley | ................. | 62/50.2 |
| 5,383,746 A * | 1/1995 | Dufourneaud | ................. | 405/53 |
| 5,634,340 A * | 6/1997 | Grennan | ................. | 60/652 |
| 6,516,616 B2 * | 2/2003 | Carver et al. | ................. | 60/659 |
| 6,517,286 B1 | 2/2003 | Latchem | | |
| 6,739,140 B2 * | 5/2004 | Bishop et al. | ................. | 62/53.1 |
| 6,813,893 B2 * | 11/2004 | Bishop et al. | ................. | 62/53.1 |
| 6,826,911 B2 * | 12/2004 | Carver et al. | ................. | 62/53.1 |
| 6,932,121 B1 | 8/2005 | Shivers, III | | |
| 6,945,055 B2 * | 9/2005 | Bishop et al. | ................. | 62/53.1 |
| 7,065,974 B2 * | 6/2006 | Grenfell | ................. | 62/50.2 |
| 2003/0051875 A1 | 3/2003 | Wilson | | |
| 2006/0076076 A1 * | 4/2006 | Darling et al. | ................. | 62/50.2 |
| 2007/0186563 A1 * | 8/2007 | Vandor et al. | ................. | 62/50.2 |
| 2009/0019887 A1 * | 1/2009 | Lourenco et al. | ................. | 62/611 |

FOREIGN PATENT DOCUMENTS

| | | |
|---|---|---|
| CA | 2318802 A1 | 8/1999 |
| CA | 2467338 A1 | 7/2003 |
| CA | 2550109 A1 | 12/2007 |
| RU | 2232342 C1 | 7/2004 |
| WO | 2007/140581 A1 | 12/2007 |

* cited by examiner

*Primary Examiner*—Frederick L Lagman
(74) *Attorney, Agent, or Firm*—Christensen O'Connor Johnson Kindness PLLC

(57) ABSTRACT

A method to increase the storage capacity of a natural gas storage cavern includes effecting a heat exchange in a heat exchanger between a stream of coolant from a refrigeration or cooling plant and a natural gas stream to cool the natural gas stream prior to injecting the natural gas stream into the natural gas storage cavern.

3 Claims, 4 Drawing Sheets

METHOD TO INCREASE STORAGE CAPACITY OF NATURAL GAS STORAGE CAVERNS WITH A REFRIGERATION SYSTEM

FIELD OF THE INVENTION

The present invention relates to a method of increasing the storage capacity of natural gas storage caverns using a refrigeration system to cool the suction and/or discharge of natural gas compressors.

BACKGROUND OF THE INVENTION

Natural gas is traditionally stored in a gaseous form in large volume salt caverns and aquifers to meet peak demand and ensure a secure supply. The gas is added to storage by compression, resulting in an increment in cavern temperature and an increment in cavern pressure. These increments in pressure and temperature increase compression costs. Gas storage is an important and valuable infrastructure used to fulfill the obligations of gas distribution companies to provide a reliable supply of gas. Storage provides supply security and the ability to balance supply and demand. Moreover, it allows companies to take advantage of seasonal price differences and to increase utilization of upstream pipeline capacity.

SUMMARY OF THE INVENTION

A method to increase the storage capacity of a natural gas storage cavern includes effecting a heat exchange in a heat exchanger between a stream of coolant from a refrigeration or cooling plant and a natural gas stream to cool the natural gas stream prior to injecting the natural gas stream into the natural gas storage cavern.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

These and other features of the invention will become more apparent from the following description in which reference is made to the appended drawings, the drawings are for the purpose of illustration only and are not intended to in any way limit the scope of the invention to the particular embodiment or embodiments shown.

DETAILED DESCRIPTIONS OF A TYPICAL STORAGE COMPRESSOR SYSTEM AND THE PREFERRED EMBODIMENT

Figure 1:
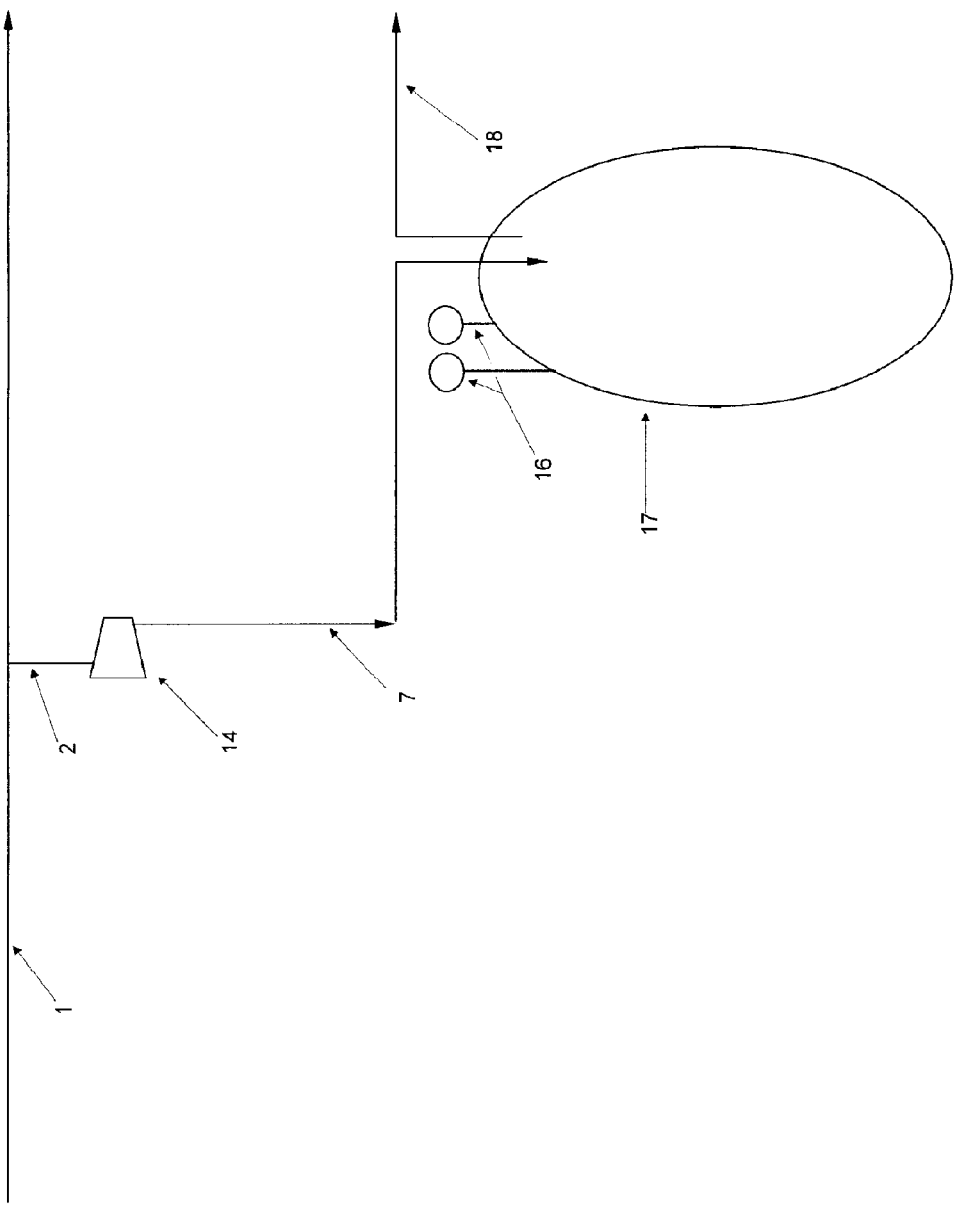
FIG. 1 labelled as PRIOR ART is a schematic diagram of a typical method to compress and store gas in a cavern.

The typical method that presently is used to compress gas for storage in a cavern will now be described with reference to FIG. 1.

In this typical cavern storage process, gas is supplied from a main gas line 1, stream 2 enters the compressor 14 suction where it is compressed and discharged through line 7 into cavern 17 for storage. Cavern sensors 16 indicate the pressure and temperature of the gas in the cavern for operations control.

Figure 2:
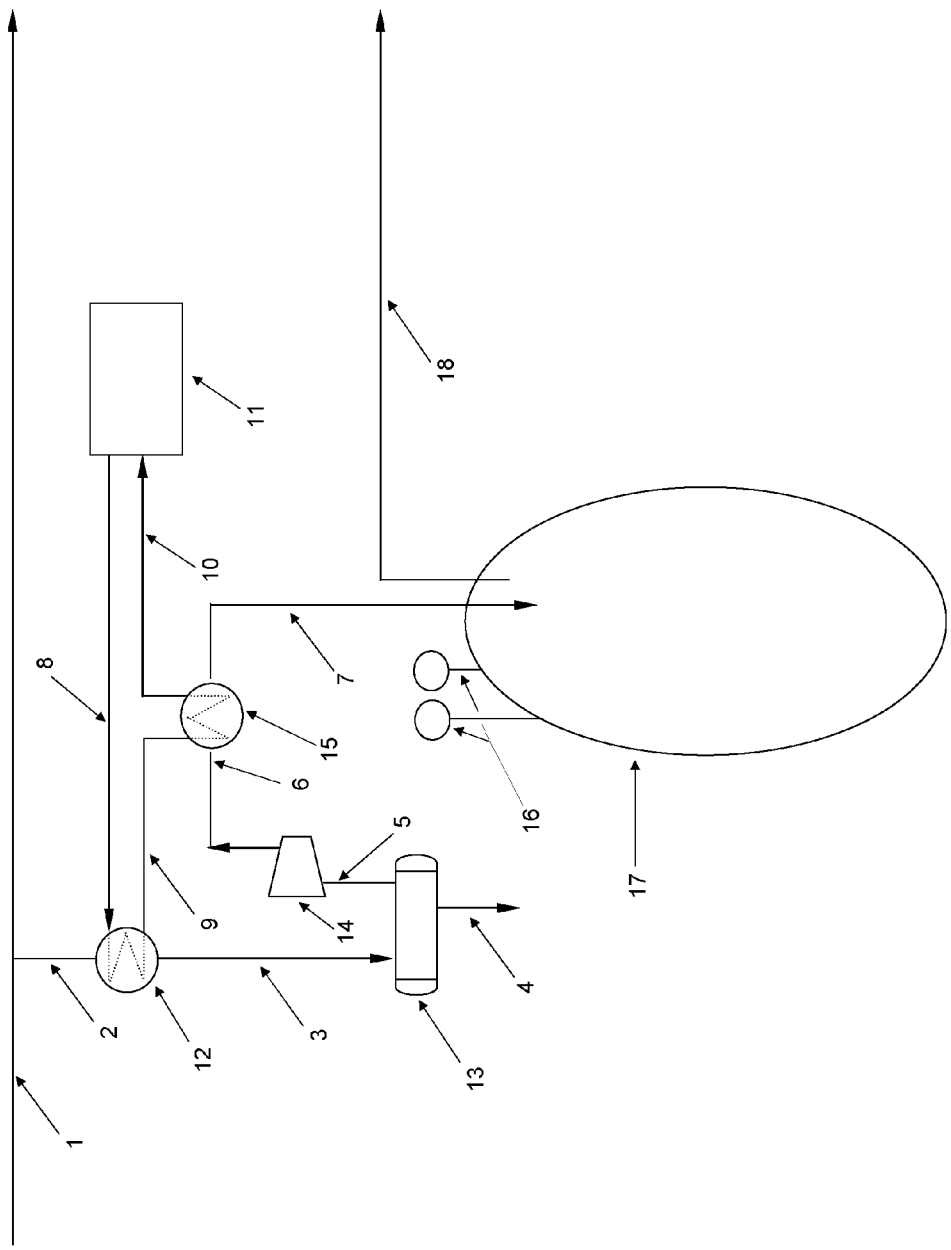
FIG. 2 is a schematic diagram that depicts an embodiment of the invention.

The preferred embodiment will now be described with reference to FIG. 2.

A gas stream to storage 2 is taken from a main gas line supply 1. The gas is first cooled on a heat exchanger 12 to increase its density. The cooled gas stream 3 enters a Knock Out drum 13 to separate any condensibles present in the stream. The condensibles are removed from Knock Out drum 13 as stream 4. The cooled and denser gas stream 5 enters the suction of compressor 14 where the gas is compressed for storage. The pre-cooling of the gas prior to compression allows for an increment in mass flow rate and a decrease in gas discharge temperature. The compressor discharge gas stream 6 enters a second heat exchanger 15 where the compressed gas is cooled before entering cavern 17. The after cooling of the compressor discharge gas increases its density and associated with it the capacity of the gas cavern on a mass per volume basis. Cavern pressure and temperature sensors 16 provide feedback on cavern gas conditions for operations control. The stored gas exits the cavern via stream 18 to meet demand. The cooling is provided by a refrigeration plant 11, a cold refrigerant stream 8 is expanded through heat exchanger 12 to cool natural gas stream 2 and increase its density. The refrigerant exits heat exchanger 12 through stream 9 and enters heat exchanger 15 to cool the compressor discharge gas. The warm refrigerant stream 10 returns to the refrigeration plant.

Figure 3:
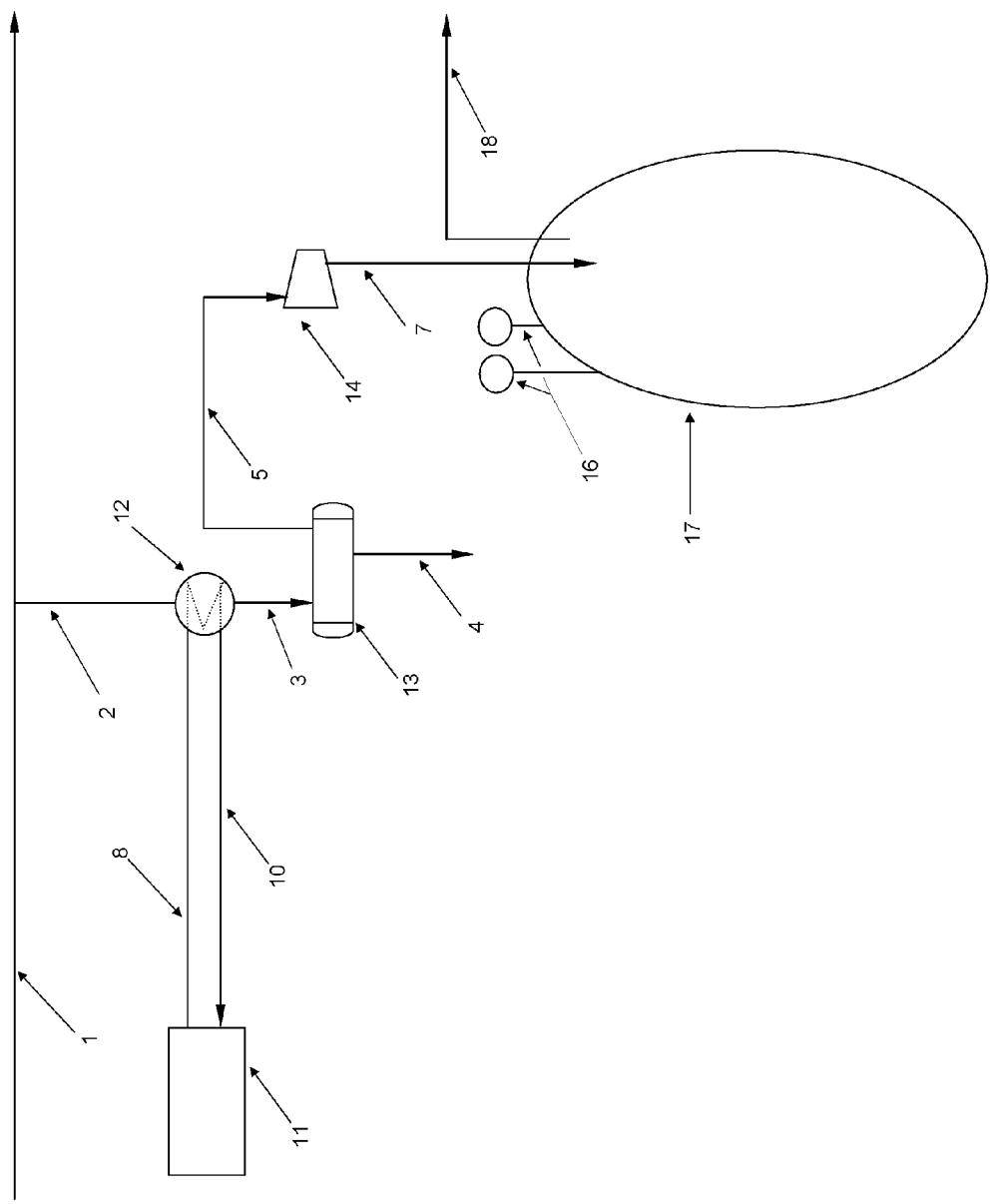
FIG. 3 is a variation on the embodiment of the invention.

A variation on the embodiment of the invention will now be described with reference to FIG. 3.

A gas stream to storage 2 is taken from a main gas line supply 1. The gas is first cooled on a heat exchanger 12 to increase its density. The cooled gas stream 3 enters a Knock Out drum 13 to separate any condensibles present in the stream. The condensibles are removed from Knock Out drum 13 as stream 4. The cooled and denser gas stream 5, enters the suction of compressor 14 where the gas is compressed for storage. The pre-cooling of the gas prior to compression allows for an increment in mass flow rate and a decrease in gas discharge temperature. The compressor discharge gas stream 7 enters cavern 17. Cavern pressure and temperature sensors 16 provide feedback on cavern gas conditions for operations control. The stored gas exits the cavern via stream 18 to meet demand. The cooling is provided by a refrigeration plant 11, a cold refrigerant stream 8 is expanded through heat exchanger 12 to cool natural gas stream 2 and increase its density. The refrigerant exits heat exchanger 12 through stream 10 and returns to the refrigeration plant.

Figure 4:
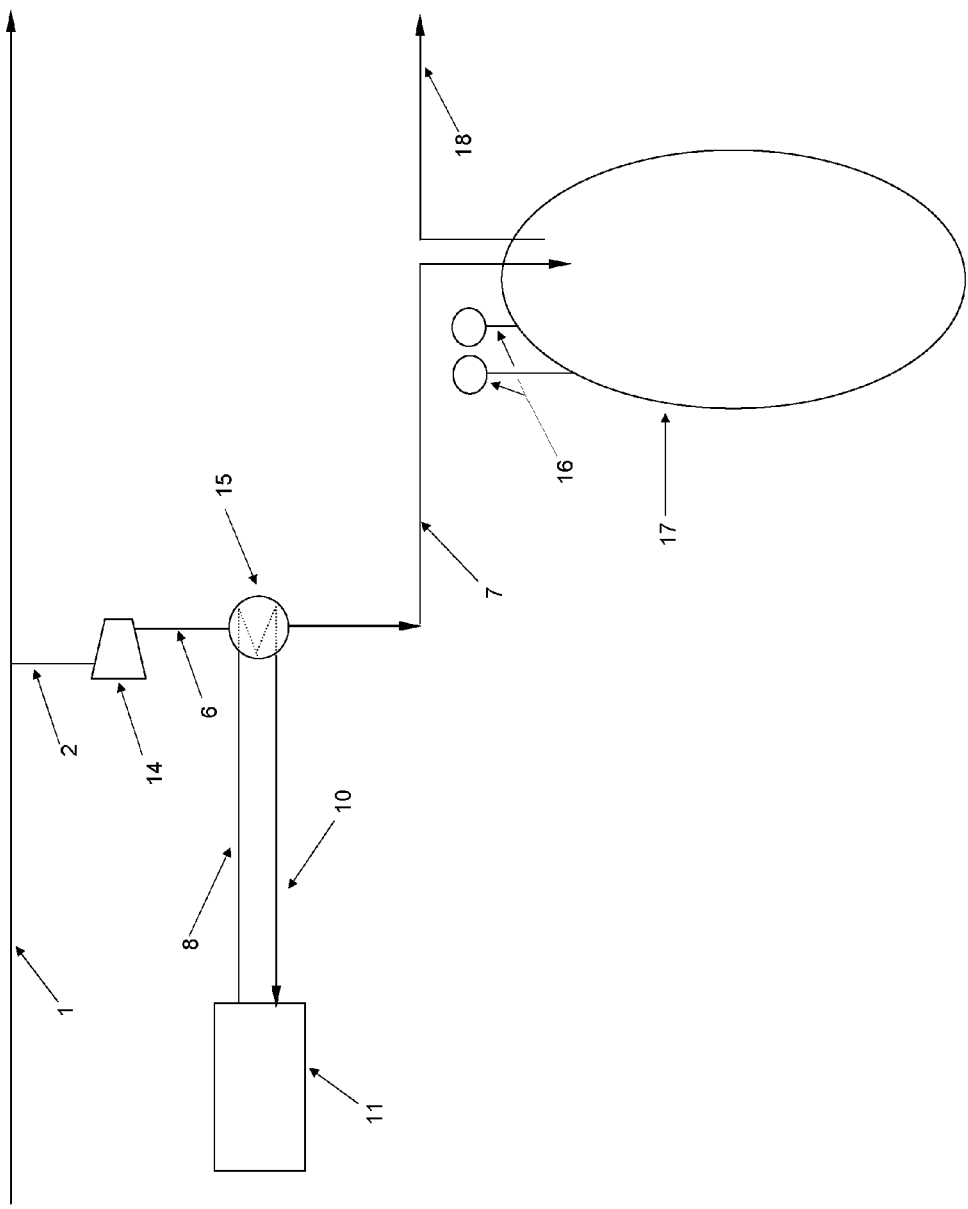
FIG. 4 is another variation on the embodiment of the invention.

A variation on the embodiment of the invention will now be described with reference to FIG. 4.

A gas stream to storage 2 is taken from a main gas line supply 1. The gas stream 2 enters the suction of compressor 14 where the gas is compressed for storage. The compressor discharge gas stream 6 enters a heat exchanger 12 where the compressed gas is cooled before entering cavern 17 through line 7. The after cooling of the compressor discharge gas increases its density and associated with it the capacity of the gas cavern on a mass per volume basis. Cavern pressure and temperature sensors 16, provide feedback on cavern gas conditions for operations control. The stored gas exits the cavern via stream 18 to meet demand. The cooling is provided by a refrigeration plant 11, a cold refrigerant stream 8 is expanded through heat exchanger 12 to cool natural gas stream 3 and increase its density. The refrigerant exits heat exchanger 12 through stream 10 and returns to the refrigeration plant.

As described above, the cooling of the natural gas serves to increase its density and reduce the temperature of the gas to the cavern, which results in an increase in the gas cavern capacity. This cooling of the natural gas can take place either before compression, after compression, or both. Cooling before the compressor is highly desirable, as it makes the process of injection more efficient (faster). Selective cooling after the compressor enables the natural gas flow to cavern storage to be maintained at a pre-selected target temperature.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiments without departing from the spirit and scope of the invention as hereinafter defined in the Claims.

What is claimed is:

1. A method to increase the storage capacity of a natural gas storage cavern, comprising:

using a compressor to inject natural gas into the natural gas storage cavern;

effecting a first heat exchange in a first heat exchanger between a stream of coolant from a refrigeration or cooling plant and a natural gas stream upstream of the compressor to cool the natural gas stream prior to passing through the compressor to make the natural gas more dense and increase the rate of injecting the natural gas stream into the natural gas storage cavern; and effecting a second heat exchange in a second heat exchanger between a stream of coolant from a refrigeration or cooling plant and a natural gas stream downstream of the compressor to cool the natural gas, thereby increasing the quantity of natural gas the natural gas storage cavern is capable of accommodating.

2. The method of claim 1, including a step of providing upstream of the compressor and downstream of the heat exchanger means to remove liquids which condense upon cooling of the natural gas stream.

3. The method of claim 1, including a step of providing temperature sensors to monitor a temperature of the natural gas storage cavern and controlling the second heat exchange to maintain the natural gas storage cavern at a pre-selected temperature.

* * * * *